United States Patent
Deau et al.

(10) Patent No.: US 9,944,009 B2
(45) Date of Patent: Apr. 17, 2018

(54) METHOD FOR MANUFACTURING A CONTAINER FROM A BLANK, INCLUDING FEEDBACK IN ACCORDANCE WITH AN ACTUAL PRESSURE AT THE END OF THE PRE-BLOWING STEP

(71) Applicant: SIDEL PARTICIPATIONS, Octeville sur Mer (FR)

(72) Inventors: Thierry Deau, Octeville sur Mer (FR); Julien Gendre, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 515 days.

(21) Appl. No.: 14/403,637

(22) PCT Filed: May 13, 2013

(86) PCT No.: PCT/FR2013/051036
§ 371 (c)(1),
(2) Date: Nov. 25, 2014

(87) PCT Pub. No.: WO2013/178903
PCT Pub. Date: Dec. 5, 2013

(65) Prior Publication Data
US 2015/0190959 A1 Jul. 9, 2015

(30) Foreign Application Priority Data
May 30, 2012 (FR) .................................... 12 55007

(51) Int. Cl.
*B29C 49/16* (2006.01)
*B29C 49/78* (2006.01)
(Continued)

(52) U.S. Cl.
CPC .......... *B29C 49/16* (2013.01); *B29C 49/6409* (2013.01); *B29C 49/783* (2013.01);
(Continued)

(58) Field of Classification Search
CPC .. B29C 2049/5827; B29C 2949/78025; B29C 2949/78042; B29C 2949/78537; B29C 2949/78554; B29C 49/783
See application file for complete search history.

(56) References Cited

U.S. PATENT DOCUMENTS

2010/0204819 A1* 8/2010 Monin .................... B29C 49/58
700/197
2010/0276849 A1 11/2010 Derrien et al.

FOREIGN PATENT DOCUMENTS

| DE | 10 2004 014653 A1 | 10/2005 |
| EP | 1 974 892 A2 | 10/2008 |
| WO | 2012/035260 A1 | 3/2012 |

OTHER PUBLICATIONS

International Search Report for PCT/FR2013/051036 dated Jul. 12, 2013 [PCT/ISP/210].

* cited by examiner

*Primary Examiner* — Stella K Yi
(74) *Attorney, Agent, or Firm* — Sughrue Mion, PLLC

(57) ABSTRACT

The invention relates to a method for manufacturing a container (2), by drawing and blowing in a mould (8), from a blank (3) made of plastic material, which includes the following operations: inserting the blank (3) in the mould (8); controlling the opening of a pre-blowing solenoid valve (17) at a predetermined pre-blowing rate ($D_P$); measuring the current pressure (P) inside the blank (3); detecting an actual time ($t_A$) for starting the pre-blowing step; calculating a time ($t_F$) for ending the pre-blowing step such that: $t_F = t_A + \Delta t - \delta$, wherein: $\Delta t$ is a predetermined time for opening the pre-blowing solenoid valve and $\delta$ is a predetermined constant; deducing therefrom an actual pressure ($P_F$) at the end of the pre-blowing step; comparing said pressure to a theoretical pressure ($P_{th}$); and if said pressures are found to (Continued)

be non-identical, ordering a modification of the pre-blowing rate ($D_P$).

6 Claims, 2 Drawing Sheets

(51) Int. Cl.
*B29C 49/64* (2006.01)
*B29L 31/00* (2006.01)
*B29C 49/12* (2006.01)
*B29C 49/06* (2006.01)
*B29C 49/58* (2006.01)
*B29K 105/00* (2006.01)

(52) U.S. Cl.
CPC .............. *B29C 49/06* (2013.01); *B29C 49/12* (2013.01); *B29C 2049/5827* (2013.01); *B29C 2949/78025* (2013.01); *B29C 2949/78042* (2013.01); *B29C 2949/78369* (2013.01); *B29C 2949/78537* (2013.01); *B29C 2949/78554* (2013.01); *B29K 2105/258* (2013.01); *B29L 2031/7158* (2013.01)

METHOD FOR MANUFACTURING A CONTAINER FROM A BLANK, INCLUDING FEEDBACK IN ACCORDANCE WITH AN ACTUAL PRESSURE AT THE END OF THE PRE-BLOWING STEP

CROSS REFERENCE TO RELATED APPLICATIONS

This application is a National Stage of International Application No. PCT/FR2013/051036 filed May 13, 2013, claiming priority based on French Patent Application No. 1255007 filed May 30, 2012, the contents of all of which are incorporated herein by reference in their entirety.

The invention relates to the manufacture of containers by blowing or stretch blowing from blanks made of plastic. "Blank" is understood as designating both injected preforms and intermediate containers obtained at the end of a first blowing operation from a preform, and intended to undergo at least one second blowing.

Conventionally, the blank is first heated to a temperature above the glass transition temperature of the material, and the preform thus heated is then inserted into a mold before injecting a fluid into it (particularly a gas such as air) under pressure in order to obtain the final container.

The injection itself comprises several successive operations. A first operation, called pre-blowing, consists of injecting a gas under low pressure into the blank (called pre-blowing pressure, generally between 5 and 16 bars). A second operation, called blowing per se, consists of injecting a gas under high pressure into the blank (called blowing pressure, generally greater than 25 bars, and commonly between 30 and 35 bars).

In an industrial production context, production rates reach several tens of thousands of containers per hour and per machine, which ordinarily comprises a series of molds mounted around the periphery of a rotating carousel. The cycle time between the time the blank is inserted into the mold and the time the formed container is ejected from the mold is several seconds. The pre-blowing operation itself only lasts several tenths of a second, generally on the order of two tenths of a second (about 200 ms).

Poor distribution of the material is a recurring defect noted in the containers. It is not necessarily a situation of ensuring that the wall thickness of the containers is constant, because in some cases it can be desirable to thicken certain areas, particularly those that will undergo significant stresses (especially near the bottom). Rather, it is a situation of ensuring that the thickness of material corresponds to the specifications for the container as defined according to its shape and use.

It is known (see document WO2008/081107 in the name of the applicant) to correlate special points on an actual blowing curve with the machine parameters (particularly the flow rate or pre-blowing pressure), and applying corrections to the parameters based on the discrepancies noted at the special points.

As a result of this approach, considerable progress has been made in controlling blow molding machines, making it possible to optimize the quality of the containers. However, it must be admitted that any error in the detection of the special points can result in an error of parameters. Consequently, the calculation techniques should be improved in order to make control of the machine more reliable, and in particular the feedback loop.

To that end, a method is first proposed of manufacturing a container by stretch blow-molding in a mold of a blank made of plastic material, comprising the operations consisting of:
  inserting the previously-heated blank into the mold;
  ordering the opening of a pre-blowing solenoid valve for placing the interior of the mold in communication with a gas source at a predetermined pre-blowing pressure and flow rate;
  measuring the pressure in the interior of the blank;
  detecting a time, called the actual pre-blowing start time, at which the pressure in the blank begins to increase;
  storing this time in memory;
  calculating a pre-blowing end time such that:

$$t_F = t_A + \Delta t - \delta,$$

where:
  $\Delta t$ is a predefined opening time of the pre-blowing solenoid valve,
  $\delta$ is a predetermined constant.
  deducing therefrom an actual end-of-pre-blowing pressure from the pressure measurements made,
  comparing the end-of-pre-blowing pressure thus determined with a predetermined theoretical end-of-pre-blowing pressure,
  if the actual end-of-pre-blowing pressure and the theoretical pre-blowing pressure are determined to be non-identical, ordering a modification of the pre-blowing rate.

Moreover, the following characteristics can be provided, alone or in combination:
  the constant $\delta$ corresponds to the response time of a blow molding solenoid valve, the opening of which places the interior of the mold in communication with a gas source at a blowing pressure greater than the pre-blowing pressure;
  if the actual pressure is determined to be greater than the theoretical end-of-pre-blowing pressure, an operation is provided consisting of ordering a decrease of the pre-blowing rate;
  if the actual pressure is determined to the less than the theoretical end-of-pre-blowing pressure, an operation is provided consisting of ordering an increase in the pre-blowing rate;
  the actual end-of-pre-blowing pressure is calculated by interpolation from memorized pressure measurements in the mold at times before and after the calculated time of the end of pre-blowing.

Secondly, a computer program is proposed which is intended to be implemented on a control unit of a machine for manufacturing containers from blanks made of plastic material, which comprises instructions for the implementation of the operations of the method set forth above.

Other objects and advantages of the invention will be seen from the following description, with reference to the appended drawings in which.

Figure 1:
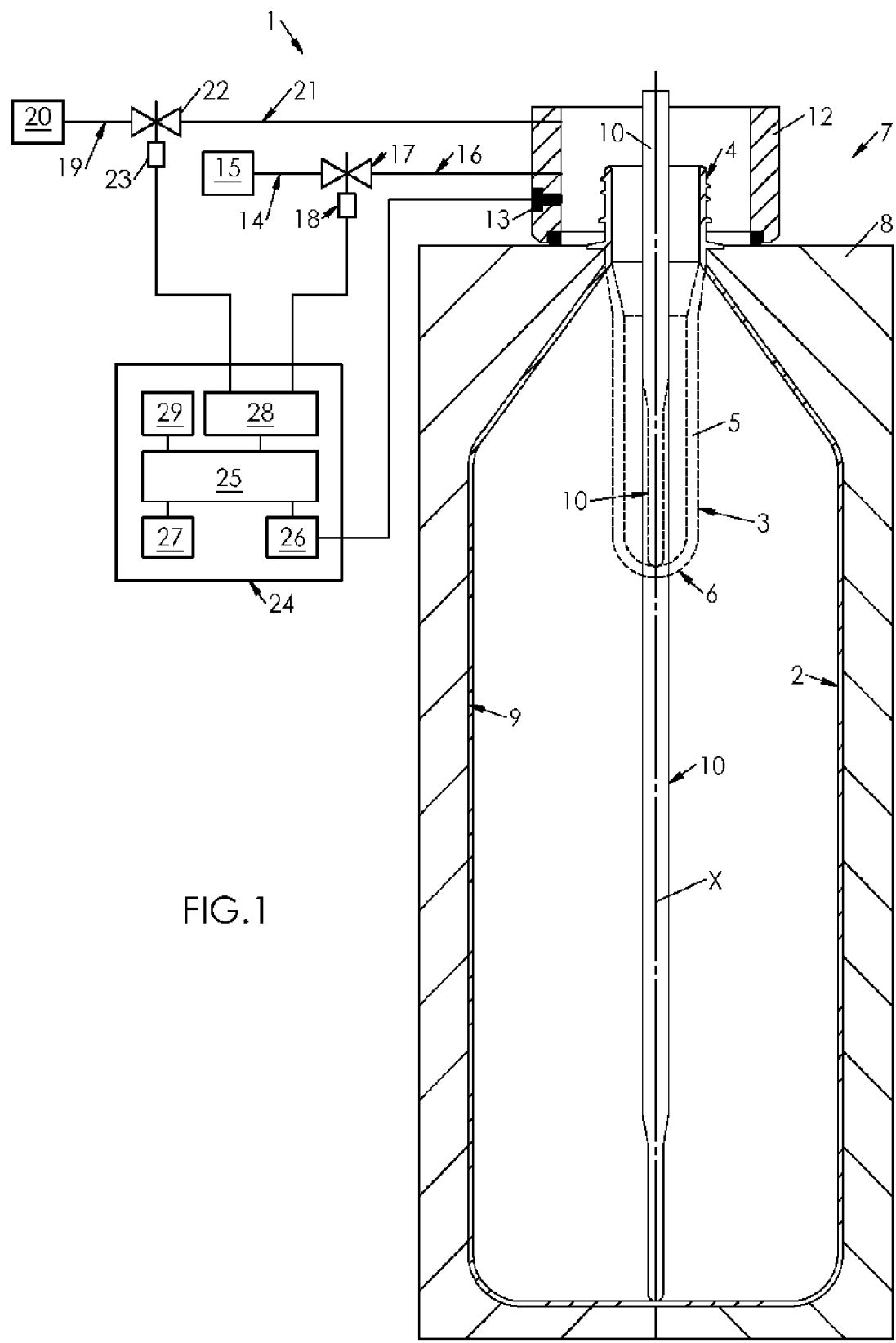
FIG. 1 is a schematic view illustrating a machine for manufacturing containers and showing more precisely, in cross-section, a mold in which a container is blown (solid lines) from a preform (broken lines)

Partially represented in FIG. 1 is a machine 1 for manufacturing containers 2 from blanks 3 made of plastic material such as PET (polyethylene terephthalate). According to a preferred embodiment, the blanks 3 are preforms from which the final containers 2 are directly obtained, without passing through an intermediate container. Each preform 3 comprises a neck 4 (which does not undergo deformation during the formation of the container 2) and a cylindrical body 5 terminated by a hemispherical bottom 6.

The machine is equipped with a plurality of forming stations 7 mounted at the periphery of a carousel, each station comprising a mold 8 composed of two mold halves which together define an internal cavity with the impression of the container 2.

Each mold 8 is intended to receive a preform 3 from an oven situated upstream from the forming stations 7 and where each preform 3 is heated, for example by means of lamps emitting infrared radiation, to a temperature T above the glass transition temperature (about 80° C. for PET) before being transferred to a forming station 7.

Each forming station 7 further comprises:
- a stretch rod 10 slidably mounted with respect to the mold 8 along a principal axis X (generally in revolution),
- a device (not shown) for controlling the axial movement of the rod 10, preferably of the electromagnetic type,
- a nozzle 12 which caps the upper face of the mold 8, covering the neck 4 which extends beyond the mold,
- a pressure sensor 13 mounted on the nozzle 12 to measure the pressure inside the preform 3, at least during the pre-blowing operation.

The machine further comprises:
- a pre-blowing system 14 comprising a source 15 of fluid (in this instance a gas, and preferably air) for pre-blowing at average pressure (of between 5 and 16 bars) and a conduit 16 (which can be at least partially formed in the side wall of the nozzle 12) connecting the source 15 to each nozzle 12 with the interposition of a pre-blowing solenoid valve 17 on which is mounted a regulator 18 of the pre-blowing flow rate $D_P$.
- a blowing system 19 comprising a source 20 of fluid (in this instance a gas, and preferably air) for high pressure blowing (of between 25 and 40 bars) and a conduit 21 (which can be at least partially formed in a side wall of the nozzle 12) connecting the source 20 the nozzle 12 with the interposition of a blowing solenoid valve 22 on which is mounted a regulator 23 of the blowing rate $D_S$,
- an electronic control unit 24, specifically in the form of a programmable logic controller (PLC), electrically connected to the pressure sensor 13, the solenoid valves 17, 22 via their respective rate regulators 18, 23 and, if applicable, to the device for controlling the movement of the rod 10.

More precisely, the control unit 24 comprises:
- an analog input module 26 connected to the pressure sensor 13 for collecting the measurements therefrom and converting them into a digital signal for processing by the processor 25,
- a memory 27 connected to the processor 25 for storing the data produced by the sensor 13 (after conversion),
- an analog output module 28 controlled by the processor 25, and controlling the solenoid valves 17, 22 via their regulators 18, 23 so as to modulate the flow rates $D_P$, $D_S$ of air furnished to the nozzle 12 and, if applicable, the device for controlling axial displacement of the rod 10,
- a communication interface 29 for the implementation in the control unit 24 of the program governing its operation.

For the specific realization of the nozzle 12 and the integration of the solenoid valves 17, 22 with the flow regulators 18, 23, reference can be made to the application FR 2 872 082 (Sidel) or its international equivalent WO 2006/008380.

Described in the following is the forming of a container 2 from a previously-heated preform 3.

The hot preform 3, at a temperature above the glass transition temperature of the material (in this case of PET, the preform is heated to a temperature generally between 120° C. and 140° C.), is inserted with the neck 4 up into a previously opened mold 8, the stretch rod 10 being in the retracted position to allow the insertion of the preform 3.

Figure 2:
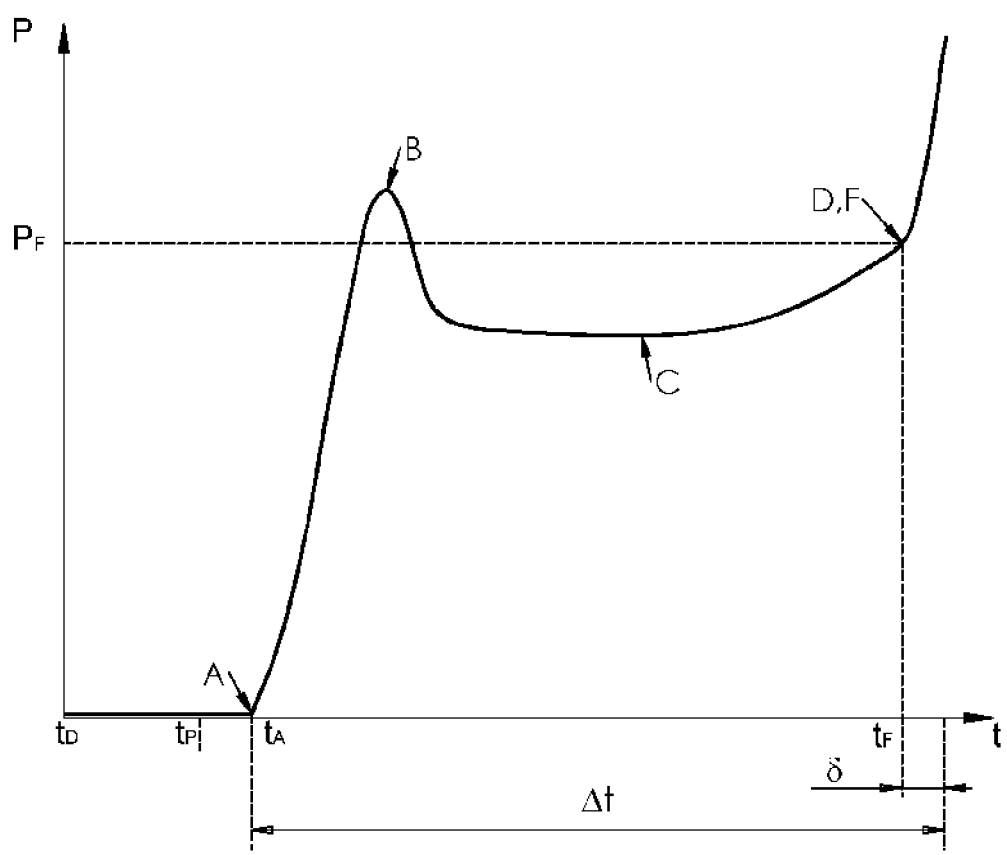
FIG. 2 is a diagram on which a curve is drawn illustrating the variations in pressure inside the preform during its pre-blowing.

As the carousel on which the forming station 7 is mounted rotats, the mold 8 is closed onto the preform 3 at a time called start time $t_D$, which constitutes the origin of the time axis (abscissa) on the diagram of FIG. 2. Starting at that time, the control unit 24 continuously controls a measurement of the pressure P in the preform 3, the values measured by the sensor 13 being collected by the input module 26, converted and then written to the memory 27.

The term "continuously" means that the frequency in which the pressure measurements are made is small, given the times necessary for significant variations of pressure in the preform 3.

To that end, it will be advantageous to choose a high-performance sensor 13, enabling pressure measurements to be made at a frequency of less than or equal to 5 ms (milliseconds), preferably less than or equal to 2 ms, the ideal being to perform the measurements at a frequency of 1 ms.

At a predetermined time, called pre-blowing time $t_P$, the control unit 24 orders the opening of the pre-blowing solenoid valve 17 in order to place the interior of the preform 3 in communication with the source 15 of pre-blowing air.

In practice, the actual time at which the pressure P in the preform 3 begins to increase lags behind the pre-blowing time $t_P$, said delay corresponding to the response time of the solenoid valve 17.

The stretching begins as soon as the rod 10 reaches a median position (represented by broken lines in FIG. 1) in which the rod 10 enters into contact with the bottom 6 of the preform 3.

Point A on the curve indicates the point at which the pressure begins to increase, which corresponds to the actual time, denoted $t_A$, of the start of pre-blowing.

The pressure in the preform 3 increases after point A as it is stretched elastically, the airflow introduced into the preform 3 being greater than the increase of the internal volume of the preform 3, until reaching a local peak at a point denoted as B, at a time denoted as $t_B$. The local peak B is attributed to a plastic flow threshold of the preform 3.

At point B the slope of the blowing curve is zero, said slope reversing from left (where it is positive) to right (where it is negative) from point B.

Beyond the local peak at point B, the pressure P undergoes a decrease resulting from the radial expansion of the preform 3 which, its plastic flow threshold having been exceeded, undergoes a plastic deformation.

It can be seen in FIG. 2 that, after point B, the pressure undergoes a first phase of rapid decrease, the slope of the pressure curve being steep, followed by a second phase of slow decrease, the slope of the curve being gradual.

The pressure P then reaches a local minimum at a point denoted C, after which the pressure again increases, first slowly, then more rapidly.

After a time delay during which the pre-blowing solenoid valve 17 is kept open, the blowing is begun by simultaneously ordering the closure of the pre-blowing solenoid valve 17 and the opening of the blowing solenoid valve 22, which causes a sharp increase in the pressure in the preform 3. This increase is illustrated by the sudden inflection of the pressure curve at the far right of FIG. 2, from a point denoted D which corresponds to the actual end of the pre-blowing and the beginning of the blowing.

The blowing operation is of no interest here, which explains why the curve of FIG. 2 is interrupted at the starting point thereof.

The hypothesis of the influence of pre-blowing on the quality of the final container has already been formulated. Numerous tests were conducted before it was possible to identify, for a given preform and final container, a pressure curve making it possible to obtain a container having characteristics (and particularly a distribution of the material) as close as possible to a pre-established set of specifications.

Said pressure curve is stored in the control unit 24 by being written to the memory 27.

The influence of points A and B has already been demonstrated and exploited (see the aforementioned document WO2008/081107). Similarly, it has been indicated as desirable to make points C and D converge by advancing the time of ordering the opening of the blowing solenoid valve.

However, it has been determined that this approach does not necessarily result in a better distribution of the material in the final container obtained. Nevertheless, tests have shown that the pressure measured at point D has an influence on the distribution of the material. However, the measurement of the point D, which is neither a local minimum nor a local maximum, is difficult and can result in the use of an erroneous pressure.

For this reason, instead of attempting to detect the point D on the curve, a mixed approach is proposed, combining measurement and calculation. Indeed, a point denoted F is sought, assumed to be identical to point D and obtained from the following formula:

$$t_F = t_A + \Delta t - \delta,$$

where:
- $t_F$ is the time (the abscissa on the graph in FIG. 2) of point F, determined to be the actual time of the end of the pre-blowing step,
- $\Delta t$ is the predefined duration (programmed into the control unit 24) of opening of the pre-blowing solenoid valve 17,
- $\delta$ is a predetermined constant as a function of the blowing solenoid valve 22. In this instance, $\delta$ is the response time (programmed into the control unit 24) of the blowing solenoid valve 22, i.e. the time elapsed between the time of ordering the opening of the solenoid valve 22 and the time of its actual opening. Said response time can reach several milliseconds, for example on the order of 5 ms.

Thus, point F provides a precise approximation of point D, since it is based on the actual point A (corresponding to the actual start of pre-blowing), to which is added the programmed duration of opening of the pre-blowing solenoid valve 17 and subtracting the response time of the pre-blowing solenoid valve 22. Said response time $\delta$ is normally furnished by the manufacturer of the solenoid valve 22. There is uncertainty about this data, but it is small (on the order of 1 ms) and has only little impact on the reliability of the calculation.

It should be noted that the response time $\delta$ can change over time as the components age. The result is a modification of the value of the time $t_F$. In order to correctly calculate said time, it is preferable to adapt the value of the response time $\delta$ over the course of time in the machine programming. The changes of the response time $\delta$ can be provided by the manufacturer, or deduced from measurements made directly on the machine.

Once the time $t_F$ has been calculated, the control unit 24 deduces the value of the respective pressure $P_F$ therefrom, as a result of the curve of memorized variations of the pressure P (FIG. 2). In a situation wherein a pressure measurement has effectively been made at the time $t_F$, the respective pressure is simply extracted from the respective pressure curve. In a situation wherein no pressure measurement has been made at the time $t_F$, the respective pressure can be deduced by interpolation (linear or polynomial) from a selection of previous and subsequent measurements.

The control unit 24 then compares the pressure $P_F$ thus obtained with a theoretical value $P_{th}$ for which it has been determined that the distribution of material in the container is satisfactory, said theoretical value $P_{th}$ being memorized in the control unit 24 by being stored in the memory 27.

If $P_F$ and $P_{th}$ are determined to be identical, the control unit 24 does not modify the pre-blowing parameters, the instruction applied to the next cycle remaining unchanged.

However, if $P_F$ and $P_{th}$ are determined not to be non-identical, the control unit orders a modification of the pre-blowing flow rate $D_P$.

In practice, the control unit 24 verifies whether the actual pressure $P_F$ falls within a tolerance range defined around the theoretical value $P_{th}$. When the pressure $P_F$ is within this tolerance range, $P_F$ and $P_{th}$ are determined to be identical and the machine parameters are preserved for the next cycle.

However, when $P_F$ falls outside the tolerance range, $P_F$ and $P_{th}$ are determined to be different, and the control unit 19 provides feedback about the pre-blowing flow rate $D_P$ in order to make it converge towards the theoretical value $P_{th}$ in the next cycle.

The pre-blowing flow rate $O_p$ affects the pressure $P_F$ in the following way:
- an increase in the pre-blowing flow rate $D_P$ causes an increase in the pressure $P_F$,
- a decrease in the pre-blowing flow rate $D_P$ causes a decrease in the pressure $P_F$.

Consequently:
- if $P_F$ is determined to be greater than $P_{th}$, the control unit 24 orders, via its output module 28, a decrease in the pre-blowing flow rate $D_P$,
- if $P_F$ is determined to be lower than $P_{th}$, the control unit 24 orders, via its output module 28, an increase in the pre-blowing flow rate $D_P$, In practice, the operations of memorizing the pressure curve, identifying point letter A, calculating the time $t_F$ and $P_F$, comparing $P_F$ the theoretical value $P_{th}$, as well as the feedback on the pre-blowing flow rate $D_P$ in accordance with the results of this comparison, are controlled by the control unit 24, which executes the instructions from a computer program implemented for that purpose in its processor 25.

The invention claimed is:

1. A method of manufacturing a container by stretch blow-molding in a mold of a blank made of plastic material, comprising:
   heating the blank;
   inserting the previously-heated blank into the mold;
   ordering an opening of a pre-blowing solenoid valve for placing an interior of the mold in communication with a source of gas at a predetermined pre-blowing pressure and a pre-blowing rate;
   measuring the pressure in the interior of the blank;

detecting an actual pre-blowing start time, $t_A$, at which the pressure in the blank begins to increase;

storing the actual pre-blowing start time in memory;

calculating a pre-blowing end time such that:

$$t_F = t_A + \Delta t - \delta,$$

where:

$\Delta t$ is a predefined opening time of the pre-blowing solenoid valve, $\delta$ is a predetermined constant;

deducing therefrom an actual end-of-pre-blowing pressure from the pressure measurements made, comparing an end-of-pre-blowing pressure thus determined with a predetermined theoretical end-of-pre-blowing pressure, if the actual end-of-pre-blowing pressure and the theoretical end of pre-blowing pressure are determined to be non-identical, ordering a modification of a pre-blowing rate.

2. The method according to claim 1, wherein the constant $\delta$ corresponds to a response time of a blow molding solenoid valve extending between a time of ordering an opening of the blow molding solenoid valve and a time, which places the interior of the mold in communication with a source of gas at a blowing pressure greater than the pre-blowing pressure.

3. The method according to claim 1, which comprises, if the actual end of pre-blowing pressure is determined to be greater than the theoretical end of pre-blowing pressure, an operation is provided comprising ordering a decrease of the pre-blowing rate.

4. The method according to claim 1, which comprises, if the actual end of pre-blowing pressure is determined to be lower than the theoretical end of pre-blowing pressure, an operation is provided comprising ordering an increase in the pre-blowing rate.

5. Method according to claim 1, wherein the actual end of pre-blowing pressure is calculated by interpolation from memorized pressure measurements in the mold at times before and after the calculated time of the end of pre-blowing.

6. A computer program to be implemented on a control unit of a machine for manufacturing containers from blanks made of plastic material, which comprises instructions for the implementation of the operations of the method of claim 1.

* * * * *